A. J. BORLAND.
Rotary Churn.

No. 9,338. Reissued Aug. 10, 1880.

Witnesses:
P. R. Richards
H. A. Allen

Inventor:
A. J. Borland,
By W. B. Richards
Atty.

N. PETERS, PHOTO-LITHOGRAPHER, WASHINGTON, D. C.

UNITED STATES PATENT OFFICE.

ANDREW J. BORLAND, OF DONNELLSON, IOWA.

ROTARY CHURN.

SPECIFICATION forming part of Reissued Letters Patent No. 9,338, dated August 10, 1880.

Original No. 191,562, dated June 5, 1877. Application for reissue filed July 6, 1880.

*To all whom it may concern:*

Be it known that I, ANDREW J. BORLAND, of Donnellson, in the county of Lee and State of Iowa, have invented certain new and useful Improvements in Rotary Churns; and I do hereby declare the following is a full, clear, and exact description of the invention, that will enable others skilled in the art to which it appertains to make and use the same, reference being had to the accompanying drawings, and to the letters of reference marked thereon, which form a part of this specification, in which—

Figure 1:
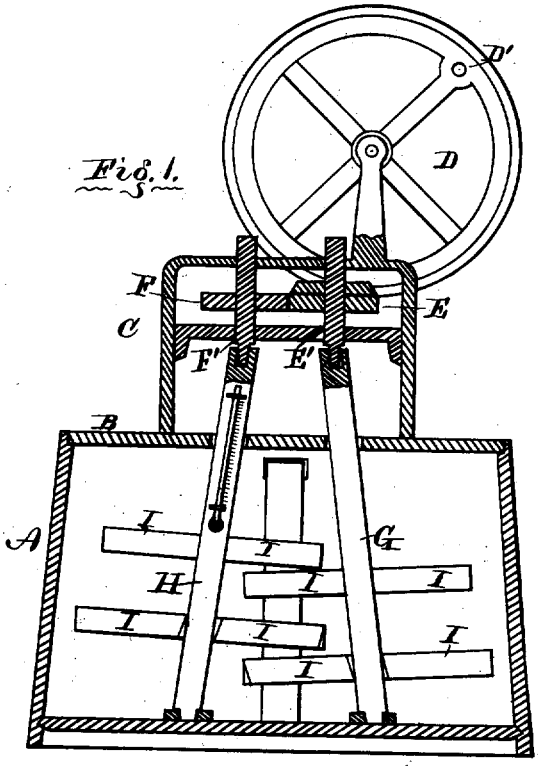
Figure 2:
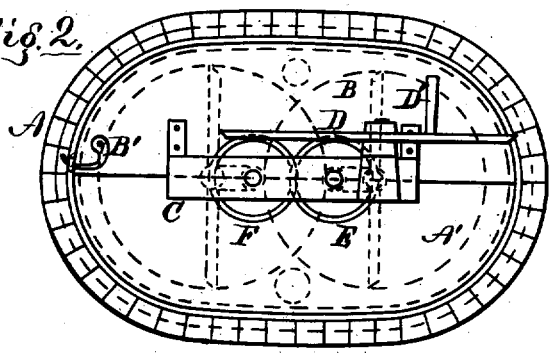

Figure 1 is a vertical section of my improved churn. Fig. 2 is a plan of the same.

This invention consists in constructions and combinations hereinafter described, and set forth in the claims hereto annexed.

In the accompanying drawings, letter A represents the churn, constructed of staves or other suitable material. The lid is made in two parts, A′ B, which are seated in a rabbeted offset in the top of the churn. The part A′ is loose, so as to be readily removed for opening the churn. The part B is held in place by holding-locks B′ at each end and side. The part B has a frame, C, rigidly attached thereto, which frame supports three gear-wheels, D E F, which wheels are geared together. The drive-wheel D has teeth on one side, gearing into wheel E, and has a crank, D′, on its other side for turning it. The wheel E gears into the wheel F, so as to turn it in the reverse direction from the wheel E. The shafts E′ F′ of wheels E F, respectively, have bearings in the frame C above and below. The lower ends of the shafts E′ F′ project below and are square in their cross-section. The ends of dasher-shafts H G fit onto these by means of square sockets in them, so as to be turned, and so as to be readily removed from the churn when the lid is raised. The shafts G H have stepped bearings in the bottom of the churn, and have dasher-blades I arranged so that those on one shaft will be opposite the spaces of the other. The shafts G H stand inclined toward each other at their upper ends to conform to the contraction of the top of the churn, and the journals on their lower ends are tapered toward their outer ends to allow of the vertical shafts E′ F′ rotating the inclined shafts G H.

The churn is made of a compressed cylindrical or elliptical form, as shown at Fig. 2, to suit the spaces traversed by the blades.

When the crank D is turned the two dashers turn in opposite directions, the blades of each traversing part of the space traversed by the blades of the other, and the shafts G H and blades I are set so that the blades pass each other. This action of the blades in opposite directions throws the milk in two separate and opposite currents transversely to the churn, and the current formed by the blades of each shaft will meet the current formed by the blades of the other shaft. The blades being lowest at their inner ends will then direct the currents downward at the center of the churn, from whence they will pass outward and upward against the sides of the churn, and the inclination of the sides will direct the current inward, where it will again be subjected to the action of the dashers, as before described.

When the churning is done the dashers may be oscillated by oscillating the drive-wheel to gather the butter.

I claim as new and desire to secure by Letters Patent—

1. In combination with the churn having an elliptical chamber tapering toward its upper end, the inclined shafts G H, having blades set at right angles to the shafts and adapted to force the milk downward and toward the middle of the churn, substantially as and for the purpose specified.

2. In combination with the churn tapering toward its upper end and the inclined shafts G H, the wheels D E F, geared together, and the wheels E F, provided with shafts E′ F′, having square ends, which fit into square sockets in the shafts G H, substantially as and for the purpose specified.

In testimony whereof I affix my signature in presence of two witnesses.

ANDREW J. BORLAND.

Witnesses:
W. F. BAIRD,
H. A. ALLEN.